United States Patent
Bridgelall

(10) Patent No.: US 7,873,386 B2
(45) Date of Patent: *Jan. 18, 2011

(54) DUAL MODE WIRELESS DATA COMMUNICATIONS

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/054,041

(22) Filed: Mar. 24, 2008

(65) Prior Publication Data

US 2008/0167069 A1    Jul. 10, 2008

Related U.S. Application Data

(63) Continuation of application No. 11/107,525, filed on Apr. 15, 2005, now Pat. No. 7,363,051, which is a continuation of application No. 09/693,137, filed on Oct. 20, 2000, now Pat. No. 6,895,255.

(51) Int. Cl.
    *H04M 1/00* (2006.01)
(52) U.S. Cl. ............... 455/553.1; 455/552.1; 455/562.1
(58) Field of Classification Search .............. 455/553.1, 455/552.1, 41.2
    See application file for complete search history.

(56) References Cited

U.S. PATENT DOCUMENTS

| 5,793,757 | A | 8/1998 | Uddenfeldt |
| 5,930,725 | A | 7/1999 | Kornby |
| 6,895,255 | B1 | 5/2005 | Bridgelall |
| 7,039,358 | B1 * | 5/2006 | Shellhammer et al. ...... 455/41.2 |
| 7,363,051 | B2 | 4/2008 | Bridgelall |

FOREIGN PATENT DOCUMENTS

| DE | 19742405 | 4/1999 |
| EP | 0822667 | 2/1998 |
| EP | 1199842 | 12/2007 |
| WO | 9929126 | 6/1999 |

* cited by examiner

*Primary Examiner*—David Q Nguyen

(57) ABSTRACT

A dual mode mobile unit is arranged to communicate in either a first or second data communications standard, such as combined Bluetooth and 802.11 operation. An interface unit converts received Bluetooth or 802.11 format signals into 802.11 frame format data signals to be provided to a digital signal processor which is programmed to process signals in either standard. The dual mode mobile unit can operate in the 802.11 standard to reserve a time interval for Bluetooth activity during which other 802.11 units will avoid transmissions to avoid interference.

12 Claims, 3 Drawing Sheets

DUAL MODE WIRELESS DATA COMMUNICATIONS

PRIORITY CLAIM

This application is a Continuation application of U.S. patent application Ser. No. 11/107,525 filed on Apr. 15, 2005 now U.S. Pat. No. 7,363,051 entitled "Dual Mode Wireless Data Communications" which is a Continuation application of Ser. No. 09/693,137 filed on Oct. 20, 2000 U.S. Pat. No. 6,895,255 issued on May 17, 2005 entitled "Dual Mode Wireless Data Communications". The entire disclosure of the prior applications is considered as being part of the disclosure of the accompanying application and hereby expressly incorporated by reference herein.

BACKGROUND OF INVENTION

One of the current techniques for providing a wireless local area network which has achieved widespread use, is international standard IFO/IEC standard 8802-11, which is also ANSI/IEEE Standard 802.11 (herein Standard 802.11). This standard provides a uniform specification for a wireless local area network media access control (MAC) and physical layer (PHY) so that equipment from multiple sources works together.

The 802.11 standard is useful for wireless local area networks which may be used in a facility, such as a store, a factory, a research laboratory or a university for providing wireless communication between a stationary system, such as a wired network or a computer and mobile units. The wired network includes one or more access points which interfaced the wired network or computer to the mobile units using radio signals. The mobile units, which may include portable computers having a wireless radio add-on, personal digital assistants, bar code scanners, point of sale devices and the like, communicate with the access point to provide wireless access to the underlying system.

There is currently being developed a specification for the "Bluetooth System" for providing wireless communication over a shorter range, for example providing communication between a portable personal computer and a printer or other devices. The Bluetooth specification is intended to provide less expensive radio protocol technology for communicating over shorter ranges. The draft Bluetooth specification is available at www.Bluetooth.com.

Both the 802.11 system and the Bluetooth system operate in the same 2.4 GHz ISM radio frequency band. The devices in both systems are mobile, and may radiate spread spectrum signals over the frequency range. Accordingly, there is a possibility of the signals from one system interfering with transmissions in the other system and causing loss of data. Also, for many applications it is desirable for a mobile unit to be able to use both systems.

It is an object of the present invention to provide a dual mode mobile unit capable of operating in both the 802.11 system and in a Bluetooth system for communications between the dual mode mobile unit and other units using either system.

It is a further object of the invention to provide methods whereby 802.11 systems and Bluetooth systems can co-exist without signal interference.

SUMMARY OF THE INVENTION

In one aspect of the invention there is provided a method for operating a dual mode mobile unit arrange to transmit and receive signals operating using first and second wireless protocols, such as IEEE 802.11 protocol and the Bluetooth protocol. The mobile unit is operated under the first wireless protocol. The mobile unit uses the first wireless protocol to reserve a transmission time interval in a frame of the first wireless protocol for purposes of operating under the second wireless protocol. During the reserved time interval the mobile unit operates under the second wireless protocol to send and receive signals.

In a preferred arrangement, where the first wireless protocol includes requirements for a transmission using that protocol for holding a reserved time, the mobile unit may transmit short transmissions of under the first wireless protocol at the beginning and the end of the reserved time interval.

In one arrangement the dual mode mobile unit operates as a master unit in the second wireless protocol to control the operation of at least slave unit that operates in the second wireless protocol. The dual mode unit can reserve a transmission time interval in a frame of the first wireless protocol and control the slave unit using the second wireless protocol to transmit during the reserved time interval.

Preferably the process of reserving transmission time in the first wireless protocol is repeated at a selected data cycle, which may be altered according to the level of radio activity using the second wireless protocol.

In accordance with the invention there is provided a method for operating a dual mode mobile unit including providing a first transmitter and a first receiver for operating using a first wireless protocol for sending and receiving signals. The first transmitter responds to first protocol baseband signals and the first receiver provides output first protocol baseband signals. A second transmitter is provided for operation using a second wireless protocol and responsive to second protocol baseband signals, and a second receiver is provided for operating using the second wireless protocol providing output second protocol baseband signals. A digital processor is programmed to process signals for both the first and the second protocols. The processor is responsive to receive digital signals in a first protocol frame and provides output digital transmission signals in the first protocol frame format. The output first and second protocol baseband signals from the receivers are converted to received digital signals in the first protocol frame format for the digital processor. The output digital transmission signals in the first protocol frame format are converted to first or second protocol baseband signals for the respective first or second transmitter.

In accordance with the invention there is provided a dual mode mobile unit for operating according to first and second wireless protocols. The dual mode mobile unit includes first and second RF modules respectively for transmitting and receiving signals according to first and second wireless protocols and each responsive to baseband signals for transmission and providing output baseband signals on reception. There is provided a digital processor responsive to received digital signals and digital data signals to be transmitted for processing the digital signals according to one of the first and second protocols. An interface unit is provided for converting received baseband signals from the first and second RF modules and supplying corresponding digital signals to the processor and for receiving digital signals from the processor and supplying first and second corresponding baseband signals to be transmitted by the first and second RF modules respectively.

In a preferred arrangement the processor controls the interface unit to send and receive signals to and from the first and second RF modules. In a preferred arrangement the interface unit receives output baseband signals from the second RF module and supplies corresponding digital signals to the digital processor in a first protocol frame format and receives digital signals from the digital processor in the first protocol frame format and supplies corresponding baseband signals to the second RF module according to the second wireless protocol.

For a better understanding of the present invention, together with other and further objects, reference is made to the following description, taken in conjunction with the accompanying drawings, and its scope will be pointed out in the appended claims.

DESCRIPTION OF THE INVENTION

Figure 3:
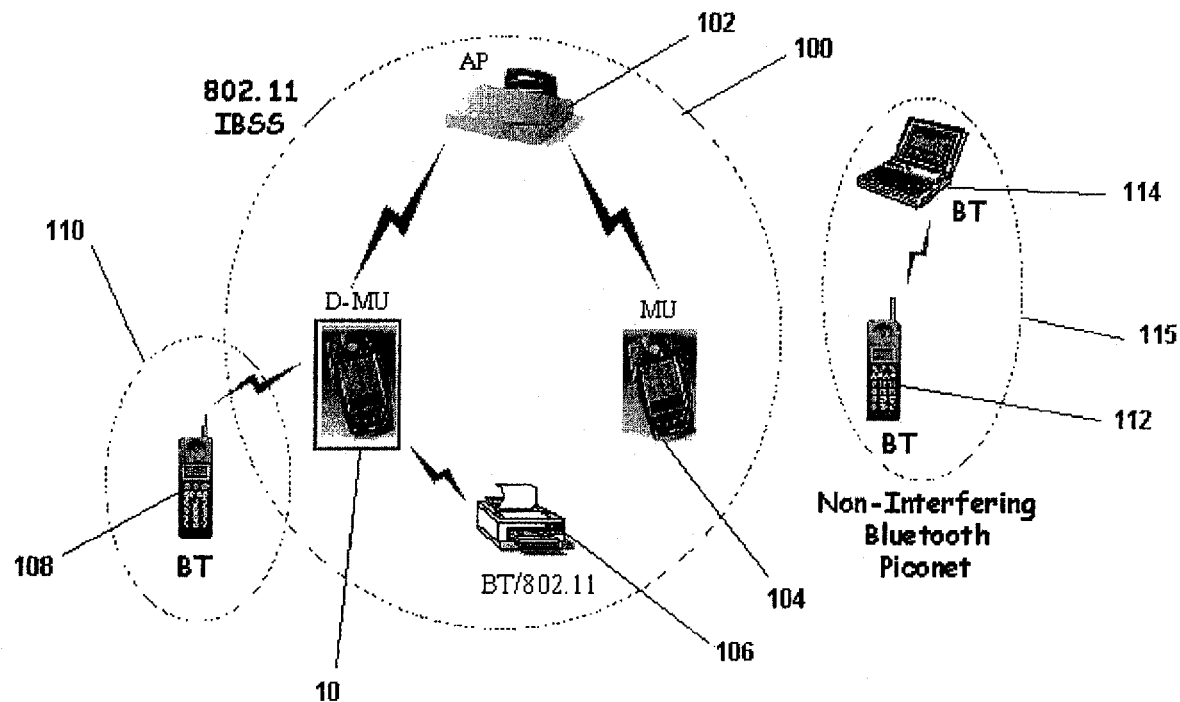
FIG. 3 is a diagram showing communications between mobile units using first and second wireless communication protocols.

Referring to FIG. 3, there is shown a configuration of a wireless local area network 100, which is operating under a first wireless protocol, such as standard 802.11 for providing a wireless local area network, which may extend over an entire business, educational or research facility. In the first wireless network 100 there is provided one or more access points 102, which may be interconnected with a host computer and provide wireless data communications to all or a portion of the facility. Typically, wireless devices using standard 802.11 can communicate with access points at a range up to about 30 meters, depending on the building configuration and the multi-path environment. In larger facilities, multiple access points are usually provided and the multiple access points may be interconnected to a host computer and to each other using a wired data network. The wireless local area network 100 shown in FIG. 3 includes a dual mode mobile unit 10 which is arranged to communicate with the access point 102 using the 802.11 standard and also to communicate with other units 108 using a second wireless communication standard, such as the Bluetooth standard. Dual mode mobile unit 10 may, for example, communicate with printer 106 using the Bluetooth standard. It may also communicate with the access point 102 using the 802.11 standard and with other mobile unit 108 which is in a Bluetooth piconet 110 using the Bluetooth standard. The drawing also shows another Bluetooth piconet 115 having units 112 and 114 communicating with each other without interference with wireless local area network 100.

The present invention addresses the problem of interference that might occur between the communications of mobile unit 10 with access point 102 using the 802.11 standard and communications being carried on by Bluetooth unit 108 using the Bluetooth standard. According to a preferred embodiment of the invention, mobile unit 10 is arranged to communicate using both standards and to coordinate communications using the Bluetooth standard with the communications using the 802.11 standard.

Figure 1:
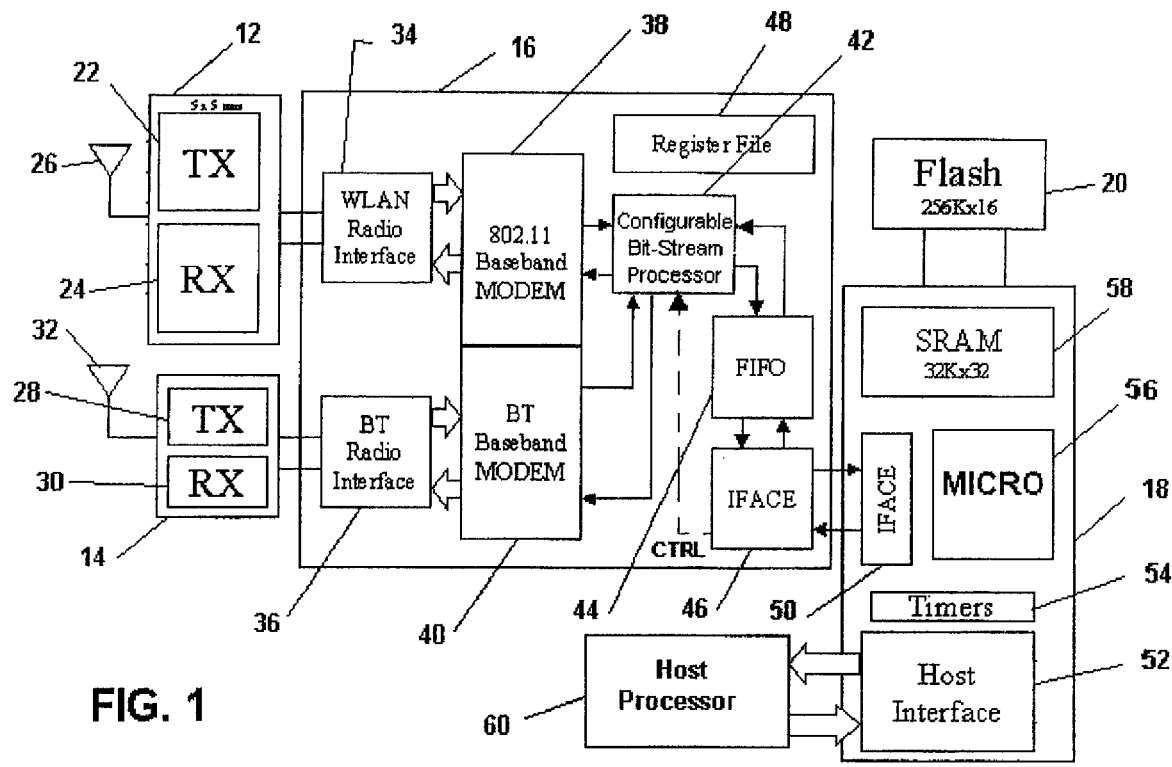
FIG. 1 is a block diagram showing the communications portion of a dual mode mobile unit according to the present invention.

A block diagram of mobile unit 10 is shown in FIG. 1. The communications portion of mobile unit 10 includes an RF module 12 for providing radio communications using the 802.11 standard and a second RF module 14 for providing radio communication using the Bluetooth standard. There is additionally provided an communications processing module 16 and a digital processor module 18. RF module 12 includes a transmitter 22 and a receiver 24, both connected to antenna 26. The transmitter 22 responds to baseband signals provided from module 16 via the WLAN radio interface 34. Transmission baseband signals and received baseband signals are demodulated and modulated by 802.11 baseband modem 38, which, as an example, may be an Alantro modem. Interface 34 and modem 38 are conventional 802.11 modules.

Communications processing module 16 is also connected to RF module 14 which includes Bluetooth transmitter 28 and Bluetooth receiver 30 which are connected to antenna 32. It should be recognized that a single antenna may be provided for both RF modules, and may be switched between the modules according to the current operation.

Communications processing module 16 includes a Bluetooth radio interface 36 and Bluetooth baseband modem 40, again following the standards of the Bluetooth systems.

Modems 38 and 40 are connected to configurable bit-stream processor 42 which receives the 802.11 and Bluetooth baseband signals, strips the overhead data, computes the CRC and provides the message data to first in and first out (FIFO) memory 44 as digital data signals. Received baseband signals from modem 40 are also processed to provide them in the frame format of 802.11 data which is likewise provided to FIFO memory 44.

Figure 5:
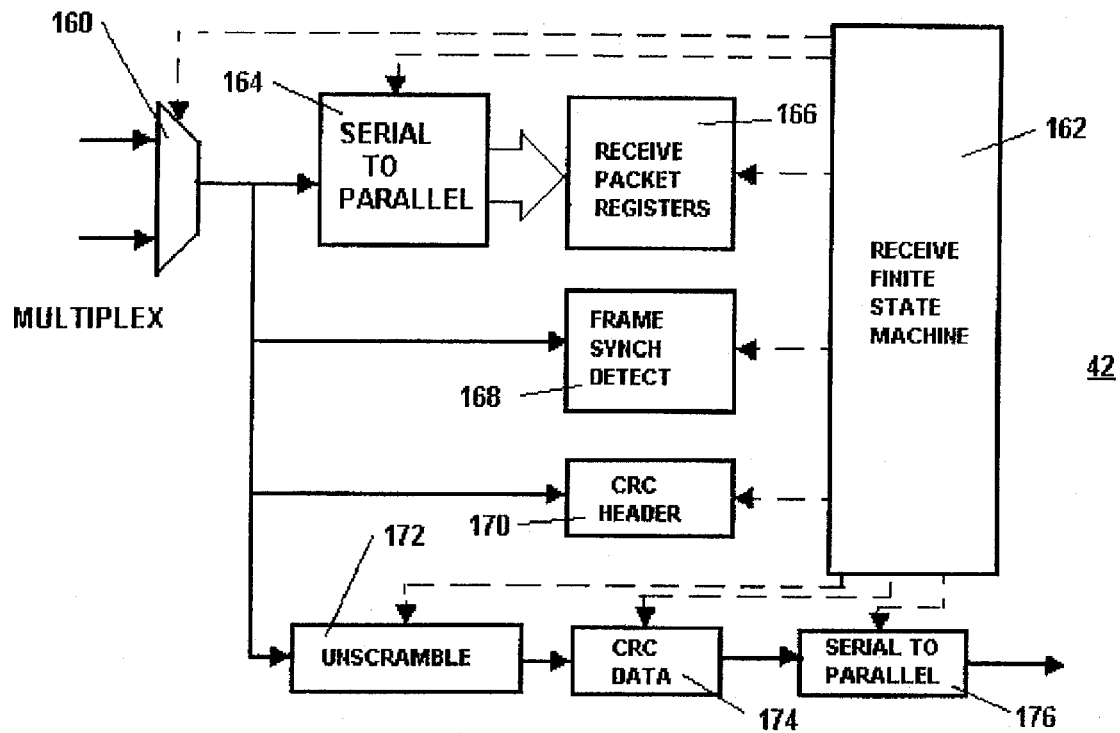
FIG. 5 is a flow design illustrating operation of configurable bit stream processor 42 for receive operations.

Configurable bit-stream processor 42, which may be a programmed field programmable logic array is arranged to process the serial bit streams for both the Bluetooth and 802.11 communications. One configuration for receiving signals is shown in FIG. 5, wherein there is provided a multiplexer 160 for connection to the 802.11 and Bluetooth modem receive channels. The receive operation is controlled by a finite state machine 162 which controls the logic elements according to the communication format, and likewise controls multiplexer 160, as indicated by dotted lines. Serial to parallel converter 164 receives the header data and converts it to parallel data which is stored in registers 166, where is can be accessed by state machine 162. The received bit stream is likewise provided to a frame synchronization detector 168 and received CRC data is provided to CRC register 170, which are likewise accessed by state machine 162. The data stream is additionally provided to unscrambler 172, CRC module 174, which performs the CRC check against the received CRC header and serial to parallel converter 176 which provides the received data to FIFO storage 44.

Figure 6:
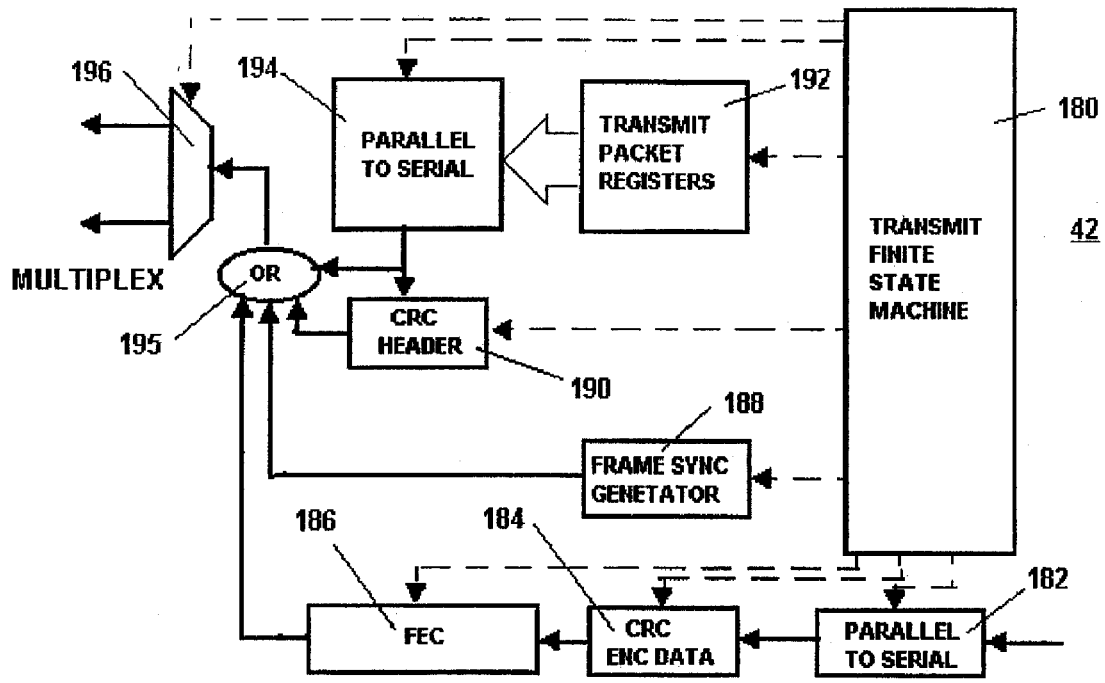
FIG. 6 is a flow design illustrating operation of configurable bit stream processor 42 for transmit operations.

FIG. 6 shows the logic operation of an example of configurable bit-stream processor for operation in the transmit mode. Finite state machine 180 is configured to generate the frame header, which is provided to register 192 and converted to serial form in parallel to serial converter 194. Frame sync is generated in generator 188 and CRC is computed and provided to CRC header register 190. Data to be transmitted is read from FIFO 44 by parallel to serial converter 182, and CRC is computed in CRC logic 184. Forward error correction is generated in logic 186. State machine 180 controls the logic units to provide the entire transmit packet in appropriate order to OR gate 195 and the packet is routed as the complete bit stream in the appropriate format to the transmit circuits of either the 802.11 modem 38 or the Bluetooth modem 40 by multiplexer 196.

Interface 46 clocks the signals for both the 802.11 and Bluetooth signals to interface 50 in digital processor 18. Both the 802.11 data signals and the Bluetooth data signals are provided in 802.11 frame format and loaded into random access memory 58 in digital processor 18. Digital processor 18 includes a processor 56, such as an ARC or ARM microprocessor and flash memory 20 which contains programs for MAC level digital processing of both 802.11 signals and Bluetooth signals encapsulated in 802.11 frame format, and provides the output message data signals to host interface 52 for transmission to host 60. Likewise signals from the host processor 60 are converted into the frame format of 802.11 standard in digital processor 18 and provided through interface 50 to the communications processing module 16. Digital signals to be transmitted, which are provided to module 16 in 802.11 frame format are stored in FIFO memory 44 and provided to circuit 42. Circuit 42 computes and adds the CRC check data for either 802.11 or Bluetooth format. If the signals are to be transmitted in 802.11 format they are provided to modem 38 which provides a modulated baseband signal to WLAN radio interface 34 for transmission. If the signals are to be transmitted in Bluetooth format circuit 42 removes the 802.11 frame format and provides a data bit stream in Bluetooth format to Bluetooth baseband modem 40 which provides a baseband signal to Bluetooth radio interface 36 for transmission by transmitter 28.

It should be recognized by those skilled in the art that as an alternative to converting Bluetooth message data to 802.11 frame format in circuit 42, 802.11 message data may be converted to and from Bluetooth frame format in circuit 42.

Figure 2:
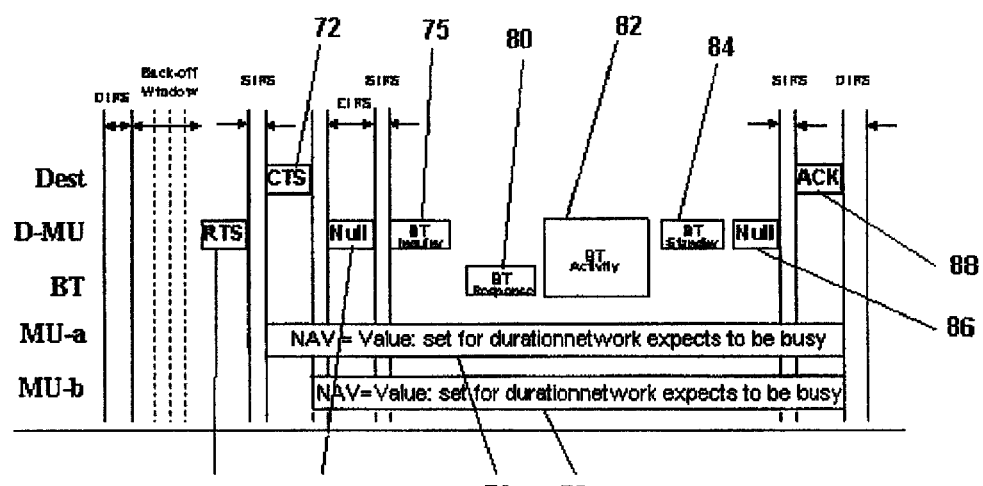
FIG. 2 is a graph showing one embodiment of the method of the invention during a frame according to standard 802.11 practice.

FIG. 2 is a time flow diagram corresponding to an 802.11 frame which indicates the preferred operation of the dual mode unit 10 of FIG. 1, or other dual mode mobile unit, in connection with coordinating Bluetooth operations to avoid interference with 802.11 transmissions. Referring to FIG. 3, it is assumed that mobile unit 10 is associated with access point 102 under 802.11 protocol. In order to provide a window for operation under the Bluetooth protocol, dual mode mobile unit 10 sends a request to send (RTS) signal 70 to access point 102. Access point 102 acknowledges with a clear to send (CTS) signal 72 providing a time interval for operation of a transmission from dual mode mobile unit 10. The CTS signal causes other mobile units, MU-a and MU-b, to set their network allocation vector (NAV) to a value indicating that the network will be busy during the transmission time interval requested by dual mode mobile unit 10. The dual mode mobile unit 10 thereafter sends a short frame 802.11 message 74. This short frame message 74 is intended to make other mobile units MU-a and MU-b believe that dual mode mobile unit 10 is sending a frame of data under Standard 802.11. Following this short frame 74, dual mode mobile unit 10 converts to Bluetooth operation as a master unit and sends a Bluetooth inquiry 75, which, for example, may be received by Bluetooth unit 108 which responds with a Bluetooth response 80. During a sub-time interval 82, unit 10 and unit 108 or other Bluetooth slaves will engage in Bluetooth communications which is followed by a Bluetooth standby signal 84. At the end of the time interval, which was reserved by dual mode mobile unit 10, dual mode mobile unit 10 sends a final 802.11 short frame 86 indicating completion of its transmission. This provokes an acknowledgment signal 88 from access point 102 which indicates according to the 802.11 protocol that the transmission has been completed. Thereafter the system continues in normal 802.11 operation. The sequence of interrupting 802.11 traffic for Bluetooth activity may be repeated at a data cycle which can be selected according to the 802.11 and Bluetooth radio activity.

An additional feature that is optionally provided by the configuration of the present invention is that the dual mode mobile unit 10 of the present invention, which controls the associated slave units in its piconet, may signal the slave units at the end of the Bluetooth radio activity (signal 84) to cause the slaves to enter a lower power "STANDBY" mode during the time the dual mode mobile unit undertakes 802.11 communication. The duration of the standby mode may be set by the master signal, may be fixed or may be ended by a renewal of Bluetooth activity by the master.

Figure 4:
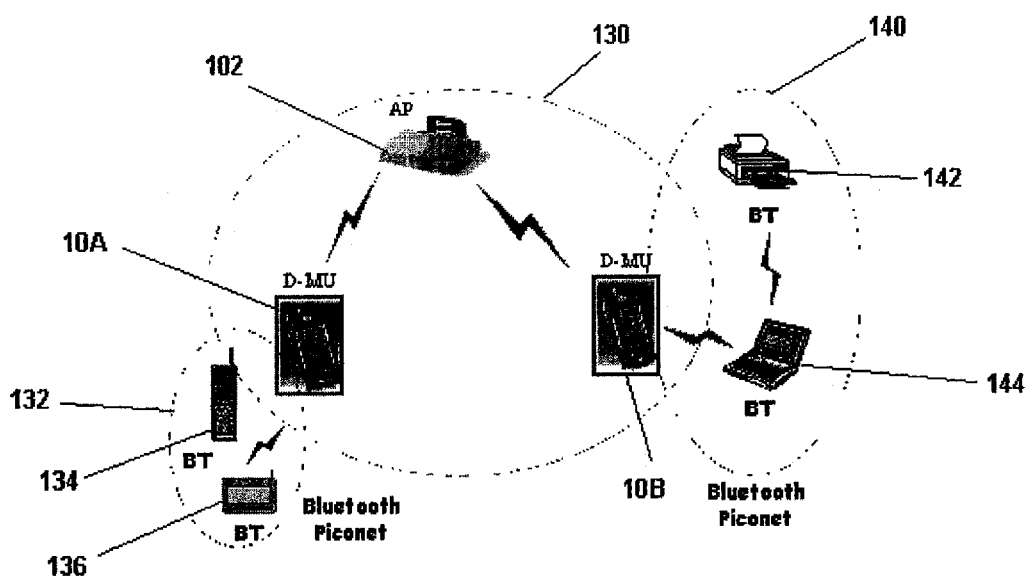
FIG. 4 is a diagram showing another configuration of mobile units for communication between mobile units using two wireless transmission protocols.

Referring to FIG. 4, there is shown a configuration wherein a Bluetooth message from piconet 132 may be relayed by dual mode mobile unit 10A through its access point 102 to another dual mode mobile unit 10B and thereafter through a Bluetooth piconet 146 to another Bluetooth unit 144. In the configuration of FIG. 4 dual mode mobile unit 10 *a* has access to Bluetooth piconet 132 which contains Bluetooth units 134 and 136. Dual mode mobile unit 10A is preferably arranged to command Bluetooth units 134 and 136 to act as slave units to dual mode mobile unit 10A. Once units 134 and 136 have been associated as slave units to dual mode mobile unit 10A, communications by mobile units 134 and 136 is controlled by dual mode mobile unit 10A to occur at specific time frame intervals which have been reserved in 802.11 wireless local area network 130 by dual mode mobile unit 10A. Specifically, referring to FIG. 2, dual mode mobile unit 10A reserves an 802.11 frame for Bluetooth activity, as it would do in its own transmissions and thereafter by using Bluetooth communication 75 instructs Bluetooth unit 134 or 136 to send its Bluetooth transmissions during the following time intervals 80, 82. Accordingly, 802.11 transmissions can be controlled to not occur during the transmission intervals reserved for Bluetooth activity by either unit 134, 136 or 10A.

The configuration of FIG. 4 also allows Bluetooth units 134 and 136 to send messages to other Bluetooth units 142, 144 in a different Bluetooth piconet 140 by way of two dual mode mobile units 10A and 10B. In particular, a data message from Bluetooth mobile unit 134 may be send to dual mode mobile unit 10A. This message may be relayed using 802.11 communication from mobile unit 10A through access point 102 to dual mode mobile unit 10B. Thereafter dual mode mobile unit 10B following the Bluetooth protocol can send the relayed message to Bluetooth mobile unit 144 or 142. In this way, the operator of Bluetooth mobile unit 134 can communicate data to be printed by Bluetooth printer 142 when the mobile unit 134 is not within the same Bluetooth piconet as printer 142.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

I claim:

1. A dual-mode mobile unit arranged to transmit and receive signals using first and second wireless protocols, comprising:

means for enabling a communication under the first wireless protocol;

means for enabling a communication under the second wireless protocol;

means for reserving a transmission time interval in a frame of the first wireless protocol; and means for communicating under the second wireless protocol during the reserved time interval, wherein the reserving a transmission time is repeated at a selected duty cycle, wherein the selected duty cycle is varied based on the activity of radio traffic using the second wireless protocol.

2. The dual-mode mobile unit as recited in claim 1, further comprising:
means for communicating under the first wireless protocol during an initial portion of the reserved time interval.

3. The dual-mode mobile unit as recited in claim 2, further comprising:
means for communicating under the first wireless protocol during a terminal portion of the reserved time interval.

4. The dual-mode mobile unit as recited in claim 1, wherein the means for enabling a communication under the second wireless protocol includes:
means for communicating as a master unit for at least one slave unit operating under the second wireless protocol, and
means for reserving a transmission time interval in a frame of the first wireless protocol and controlling the slave unit using the second wireless protocol to transmit using the second wireless protocol during the reserved time interval.

5. The dual-mode mobile unit as recited in claim 4, further comprising:
means for communicating under the first wireless protocol during an initial portion of the reserved time interval.

6. The dual-mode mobile unit as recited in claim 5, further comprising:
means for communicating under the first wireless protocol during a terminal portion of the reserved time interval.

7. A method in a dual-mode mobile unit arranged to transmit and receive signals using first and second wireless protocols, the method comprising:
communicating with the mobile unit using the first wireless protocol;
reserving by the mobile unit a transmission time interval in a frame of the first wireless protocol, wherein the reserving transmission time is repeated at a selected duty cycle which is varied based on the activity of radio traffic using the second wireless protocol; and
communicating with the mobile unit using the second wireless protocol during the reserved time interval, wherein the mobile unit, when communicating using the second wireless protocol, acts as a master unit for at least one slave unit communicating using the second wireless protocol and controls the slave unit using the second wireless protocol to transmit using the second wireless protocol during the reserved time interval.

8. The method as recited in claim 7, further comprising:
transmitting with the mobile unit using the first wireless protocol during an initial portion of the reserved time interval.

9. The method as recited in claim 8, further comprising:
transmitting with the mobile unit using the first wireless protocol during a terminal portion of the reserved time interval.

10. A system for operating a dual-mode mobile unit arranged to transmit and receive signals using first and second wireless protocols, comprising:
means for communicating with the mobile unit using the first wireless protocol;
means for reserving a transmission time interval in a frame of the first wireless protocol, wherein the reserving transmission time is repeated at a selected duty cycle which is varied based on the activity of radio traffic using the second wireless protocol; and
means for communicating with the mobile unit using the second wireless protocol during the reserved time interval, wherein the mobile unit, when communicating using the second wireless protocol, acts as a master unit for at least one slave unit communicating using the second wireless protocol and controls the slave unit using the second wireless protocol to transmit using the second wireless protocol during the reserved time interval.

11. The system as recited in claim 10, further comprising:
means for operating the mobile unit to transmit using the first wireless protocol during an initial portion of the reserved time interval.

12. The system as recited in claim 11, further comprising:
means for operating the mobile unit to transmit using the first wireless protocol during a terminal portion of the reserved time interval.

* * * * *